(12) United States Patent
Weber

(10) Patent No.: US 8,002,882 B2
(45) Date of Patent: Aug. 23, 2011

(54) DROPLET SEPARATOR INSTALLATION

(75) Inventor: Detlef Weber, Essen (DE)

(73) Assignee: Munters Euroform GmbH, Aachen (DE)

( * ) Notice: Subject to any disclaimer, the term of this patent is extended or adjusted under 35 U.S.C. 154(b) by 709 days.

(21) Appl. No.: 11/579,393

(22) PCT Filed: Nov. 4, 2004

(86) PCT No.: PCT/DE2004/000940
§ 371 (c)(1),
(2), (4) Date: Nov. 2, 2006

(87) PCT Pub. No.: WO2005/107921
PCT Pub. Date: Nov. 17, 2005

(65) Prior Publication Data
US 2008/0264260 A1    Oct. 30, 2008

(51) Int. Cl.
*B01D 45/08*    (2006.01)

(52) U.S. Cl. .................. 96/232; 96/356; 96/358; 55/440

(58) Field of Classification Search .................... 96/189, 96/228, 232, 356, 358; 55/440
See application file for complete search history.

(56) References Cited

U.S. PATENT DOCUMENTS

| | | | | |
|---|---|---|---|---|
| 3,870,487 A | * | 3/1975 | Hurlbut et al. | 55/436 |
| 5,662,721 A | * | 9/1997 | Bresowar | 96/356 |
| 5,749,930 A | * | 5/1998 | Wolf et al. | 96/228 |
| 6,080,225 A | * | 6/2000 | Forster | 95/57 |

FOREIGN PATENT DOCUMENTS

| | | |
|---|---|---|
| DE | 19501282 | 8/1996 |
| DE | 19501282 A1 * | 8/1996 |

* cited by examiner

*Primary Examiner* — Duane Smith
*Assistant Examiner* — Ives Wu
(74) *Attorney, Agent, or Firm* — Andrew Wilford

(57) ABSTRACT

A droplet separator installation for gas washers, cooling towers etc. is described according to which a row of parallel droplet separator profiles is supported at a support construction by means of an intermediate construction. The intermediate construction serves for the support and the stabilization of the droplet separator profile row and for the support of a rinsing means for rinsing the droplet separator profile row.

14 Claims, 3 Drawing Sheets

DROPLET SEPARATOR INSTALLATION

CROSS REFERENCE TO RELATED APPLICATIONS

This application is the US national phase of PCT application PCT/DE2004/000940, filed 4 Nov. 2004, published 17 Nov. 2005 as WO2005/107921, and claiming the priority of PCT patent application PCT/DE2004/000940 itself filed 4 Nov. 2004, whose entire disclosures are herewith incorporated by reference.

FIELD OF THE INVENTION

The present invention is directed to a droplet separator installation for gas washers, cooling towers etc.

BACKGROUND OF THE INVENTION

Such droplet separator installations are known which have inclined rows of parallel droplet separator profiles. Collecting ducts for intercepting and discharging the separated liquid are arranged adjacent to the lower ends of the rows. A plurality of droplet separator profiles arranged parallel with respect to one another are combined through common side walls to generate an assembly, wherein the individual assemblies are adapted to be connected by means of lateral coupling tubes. Furthermore, such known droplet separator installations have carrier straps for the support of rinsing means for rinsing the droplet separator profile row. The droplet separator profile rows are supported in operation on an appropriate support structure of the gas washer, cooling tower etc.

OBJECT OF THE INVENTION

It is the object of the present invention to provide a droplet separator installation for gas washers, cooling towers etc. which is characterized by a simple mounting possibility and an especially stable design.

SUMMARY OF THE INVENTION

According to the invention this object is achieved by a droplet separator installation for gas washers, cooling towers etc. comprising at least one row of parallel droplet separator profiles, which row is arranged with respect to the gas flow in an inclined, roof-like or V-like manner, an intermediate structure for the support and stabilization of the droplet separator profile row and for the support of a rinsing means for rinsing the droplet separator profile row, wherein the intermediate structure includes at least one side wall for the droplet separator profile row and a carrier member for the rinsing means connected thereto, and a support structure for supporting the intermediate structure.

With the inventive solution a unitary intermediate structure is used which takes over not only the support and the stabilization of the droplet separator profile row but also the support of a rinsing means for rinsing the droplet separator profile row. This intermediate structure comprises at least one side wall for the droplet separator profile row and a carrier member for the rinsing means connected thereto which are removably or non-removably connected. However, both form together a premounted assembly so that the intermediate structure together with the droplet separator profile row is supported or fixed in a premounted condition at the place of installation on the support structure. The side wall and the carrier member connected thereto stabilize the droplet separator installation. Furthermore, they serve for the support of the droplet separator profile. row on the support structure wherein this is preferably realized by supporting the lower edge of the side wall on the support structure.

Preferably, the side wall is angularly formed and has at its lower end a horizontal portion emanating from the vertical part of the side wall and serving for the support of the droplet separator profile row on the support structure.

Accordingly, the droplet separator profile row forms a compact assembly or unit together with the intermediate structure which assembly or unit is characterized by a high stability and which can be mounted in a simple and fast manner.

Preferably, furthermore the intermediate structure has at least one cross beam connected to the side wall. By the arrangement of such a cross beam the stability of the installation is further improved wherein the cross beam preferably operates as tie rod and is guided through an aperture in the side wall and is fixed at the same. Preferably, the cross beam lies on the horizontal flange of the side wall, if such a flange is present.

As mentioned above, the above-described embodiment is adapted to be mounted in an especially simple manner since the droplet separator profile row and the intermediate structure form a premounted assembly. However, it is disadvantageous with this embodiment that the whole assembly consisting of the intermediate structure and the droplet separator profiles has to be replaced if single droplet separator profiles of a row have to be serviced or replaced. This is connected with high efforts and is expensive. Accordingly, with another preferred embodiment of the invention a separation of the droplet separator profiles from the intermediate structure is provided so that the droplet separator profiles can be dismounted, mounted, serviced, cleaned etc. independently of the intermediate structure. For this, a plurality of adjacent droplet separator profiles are combined to form a package by means of an end wall, and this package is supported by means of the end wall at the side wall of the intermediate structure in a detachable and in longitudinal direction of the same displaceable as well as in transverse direction of the same substantially undisplaceable manner. Accordingly, for service purposes a droplet separator profile package can be detached from the intermediate structure without any problems and can be correspondingly serviced, replaced etc. The adjacent droplet separator profile packages can be pushed apart since their end walls are displaceably supported in longitudinal direction of the side wall of the intermediate structure so that the detachment of the droplet separator profile package is facilitated. Since on the other side the droplet separator profile packages are supported in transverse direction substantially undisplaceably at the side wall of the intermediate structure by means of their end walls, in this manner a movement of the packages in transverse direction is avoided or a change of the angle of inclination is prevented with profiles arranged in an inclined, roof-like or V-like manner. Accordingly, the side walls of the intermediate structure operate as abutments preventing a reduction of the angle of inclination of the profiles.

Since with the inventive solution a plurality of droplet separator profiles is combined to obtain a package the mounting expense is only slightly increased compared with the above-described inventive embodiment since the intermediate structure is furthermore mounted as assembly whereafter the individual droplet separator profile packages are supported in a detachable manner at the side wall of the intermediate structure and are supported in a longitudinally displaceable manner. Preferably, adjacent droplet separator packages are connected to one another in such a manner that this connection can be manually released simply, for instance by means of appropriate clamping means. Accordingly, if a droplet separator profile package is to be replaced firstly the clamping means are released, thereafter the adjacent droplet separator profile packages are slightly pushed apart, and finally the droplet separator profile package which is to be serviced is detached upwardly from the intermediate structure or the side wall thereof.

Normally, the intermediate structure has two side walls. The droplet separator profile package also is normally provided with two end walls of which each is supported at a side wall of the intermediate structure in the above-described manner.

Viewed across the cross-section of a gas washer, preferably, a plurality of adjacent intermediate structures are provided which, respectively, are supported on an appropriate support structure (cross beams) of the gas washer. Furthermore, viewed across the cross-section of the gas washer, a plurality of droplet separator profile packages are arranged which are supported at the side walls of the intermediate structures (are detachably and displaceably supported). In this case not every intermediate structure has to be associated with one droplet separator profile package. The droplet separator profile packages can rather differ in their width from the width of the intermediate structures, i.e. can be designed larger or smaller than the same, so that the joints formed between the droplet separator profile packages must not coincide with the joints formed between the intermediate structures (side walls). Furthermore, the droplet separator profile packages can be arranged offset with respect to the intermediate structures. Accordingly, an especially preferred embodiment is characterized by the feature that the joints of the side walls of the intermediate structures arranged side by side are spaced from the joints of the end walls of the droplet separator profile packages arranged side is by side. In this manner no continuous joint from the droplet separators to the intermediate structure results which can result in corresponding leakages of liquid.

According to a preferred embodiment of the inventive solution the intermediate structure includes at least one cross beam connected to the side wall or the side walls of the intermediate structure. This cross beam can be disposed above and/or below the droplet separator packages, connects the two side walls of the intermediate structure (if two side walls are present) so that the intermediate structure forms an assembly, stabilizes the intermediate structure or the droplet separator profile packages arranged thereat, and serves for the support of a rinsing means for the droplet separator profiles which, for instance, can be realized by tubes for feeding an appropriate rinsing liquid which are provided with nozzles. Accordingly, such rinsing means can be disposed below and/or above the droplet separator profiles. If a cross beam is disposed above the droplet separators it is preferably fixed to lateral vertical rods which extend upwardly from the side walls of the intermediate structure.

The arrangement of a droplet separator profile package at the side wall of an intermediate structure is preferably realized by inserting the respective end wall of the droplet separator profile package into a groove disposed at the side wall and serving for the uptake and guidance of the end wall of a droplet separator profile package. This groove is dimensioned in such a manner that it enables a longitudinal displacement of the end wall with droplet separator profile package and has moreover some play in width direction so that corresponding material expansions are taken into account, a simple detachment and reinsertion is enabled but nevertheless an abutment against displacements of the packages in transverse direction is provided. Such a groove at the side wall of the intermediate structure is preferably formed by an inwardly and then upwardly extending portion of the side wall. Since the end wall of the droplet separator profile package projects beyond the lower edge of the profiles downwardly the projecting portion of the end wall can be inserted into the groove formed by the side wall without any problems. Normally, this is realized symmetrically at both ends of a droplet separator profile package.

The present invention is generally directed to the arrangement of rows of droplet separator profiles disposed parallel with respect to one another by means of an intermediate structure at the support structure of a gas washer, cooling tower etc. Especially, the invention is directed to a droplet separator installation which has two rows of droplet separator profiles arranged one above the other of which the upper row is formed in a roof-like manner and the lower row is formed in a V-like manner. Furthermore, the invention is directed to the case according to which the droplet separator installation has two rows of droplet separator profiles arranged one above the other of which the upper row is formed in a V-like manner and the lower row is formed in a roof-like manner. By these special installations especially good cleaning effects are obtained and the rinsing water consumption can be substantially reduced. Furthermore, an especially small height can be obtained with such installations.

According to another embodiment the droplet separator installation has also two rows of droplet separator profiles arranged one above the other which, however, have in this case a common intermediate structure which includes a side wall at which at least the end wall of a droplet separator profile package of a row is supported in a detachable and in longitudinal direction of the side wall displaceable as well as in transverse direction of the same substantially undisplaceable manner. Accordingly, with this embodiment not only the upper but also the lower droplet separator profile package can be detachably arranged at the intermediate structure in the above-described manner. However, also only one package can be arranged detachably while the package arranged below or above is fixedly connected to the intermediate structure. A fixed installation is preferably true with the lower package so that the upper package can be detached and thus the lower package can be made accessible in this manner.

Of course, two rows of droplet separator profiles arranged one above the other can have a single support structure either at which the intermediate structures of both superposed rows are commonly supported.

The oppositely inclined droplet separator profiles of a roof-like or V-like package are preferably removably connected by means of end plates. According to a special solution the end plates of the oppositely inclined droplet separator profiles of a package are removably fixed to one another by lateral locking. In this manner the two halves of a roof-like or V-like package can be still separated from one another without any problems so that the is service or replacement possibilities can still be further improved by this. So, for instance, even in situ the two halves of a V-like or roof-like package can be separated from one another by lateral displacing, and one half of the package can be replaced since a lateral displacement possibility is provided. Of course, the package can be removed as a whole either and can be separated at another place.

The special design and arrangement of the rinsing means is not subject of the invention. For this known designs can be used. The same is true for the design of the individual droplet separator profiles which can be conventionally formed, for instance in a corrugated manner. Even with respect to the design of the intermediate structure no restrictions exist if only one side wall and at least one carrier member for the rinsing means are present. Not only the droplet separator profiles but also the intermediate structure are preferably made from appropriate plastic materials.

The connection between the respective droplet separator profiles and the corresponding end wall of a package is preferably realized by screwing or welding. The connection of respective members of the intermediate structure (cross beams, side walls, vertical rods) is preferably realized by screwing either. With a single screw connection the cross beam and a vertical rod can be connected to one side wall.

BRIEF DESCRIPTION OF THE DRAWING

In the following the invention is described by means of examples in connection with the drawing in detail. In the drawing.

Figure 1:
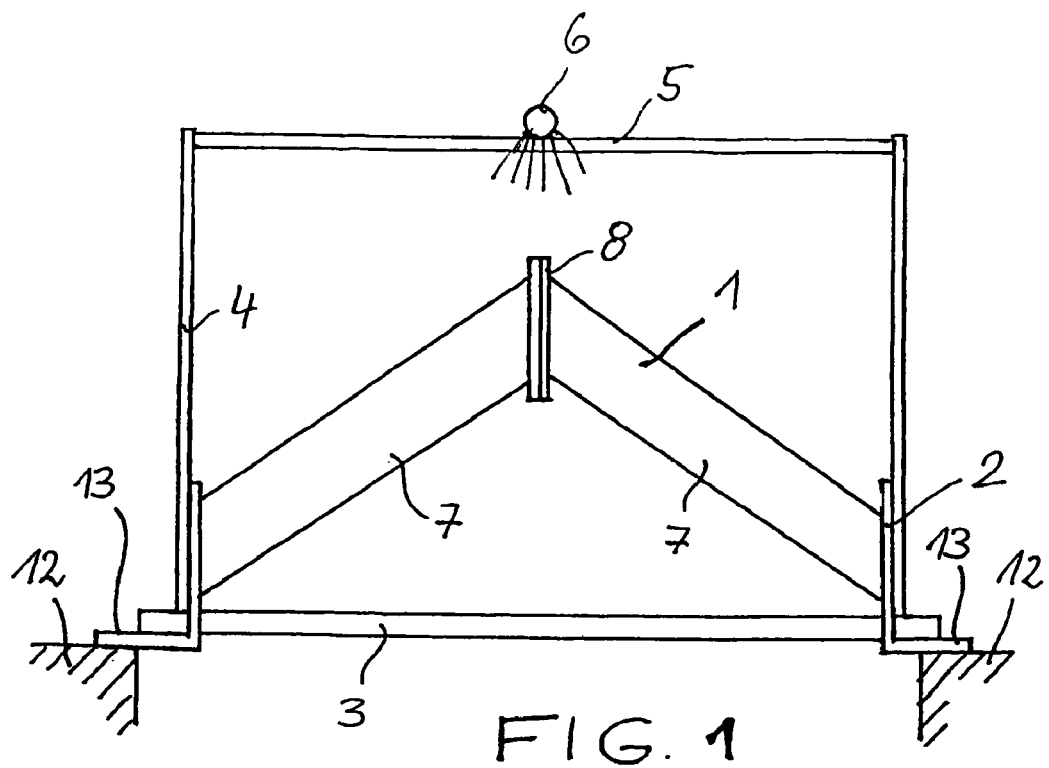
FIG. 1 is a schematic side view of a droplet separator installation with support structure, intermediate structure and a row of droplet separator profiles arranged in a roof-like manner according to a first embodiment of the invention.

The droplet separator installation schematically shown in FIG. 1 includes a support structure 12, an intermediate structure and a row 1 of droplet separator profiles 7 arranged in a roof-like manner. This droplet separator installation is arranged in a gas washer, for instance, and is supported on metal beams of a support structure 12 formed in the gas washer. In this embodiment the gas flow is directed from above to below in the figure.

The droplet separator installation is formed in an inventive manner. The row 1 of the droplet separator profiles 7, which are arranged parallel with respect to one another in the row, is not directly supported on the support structure 12 but rather connected to an intermediate structure serving for the support and the stabilization of the droplet separator profile row 1 as well as for the support of a rinsing means for the droplet separators which is indicated in FIG. 1 by a tube 6 provided with nozzles. The intermediate structure is formed by two side walls 2 with which the droplet separator profiles 7 are fixedly connected, a cross rod 3 serving as tie rod for the roof-like droplet separator profile row 1, two vertical rods 4 which are fixedly connected to the side walls 2 and extend upwardly from the same, and a cross rod 5 carried by the vertical rods 4 on which the above-cited nozzle tube 6 is arranged. This intermediate structure forms together with the row 1 of the droplet separator profiles an assembly or unit which is premounted and is mounted at the place of installation on the whole by laying side flanges 13 of the side walls 2 on the metal beams of the support structure 12. Preferably, the whole assembly consists of plastic, and the components are screwed with one another. The two inclined layers of the droplet separator profiles 7 which form the roof-like row 1 are centrally fixed to one another at end walls 8, for instance by screwing either.

Figure 2:
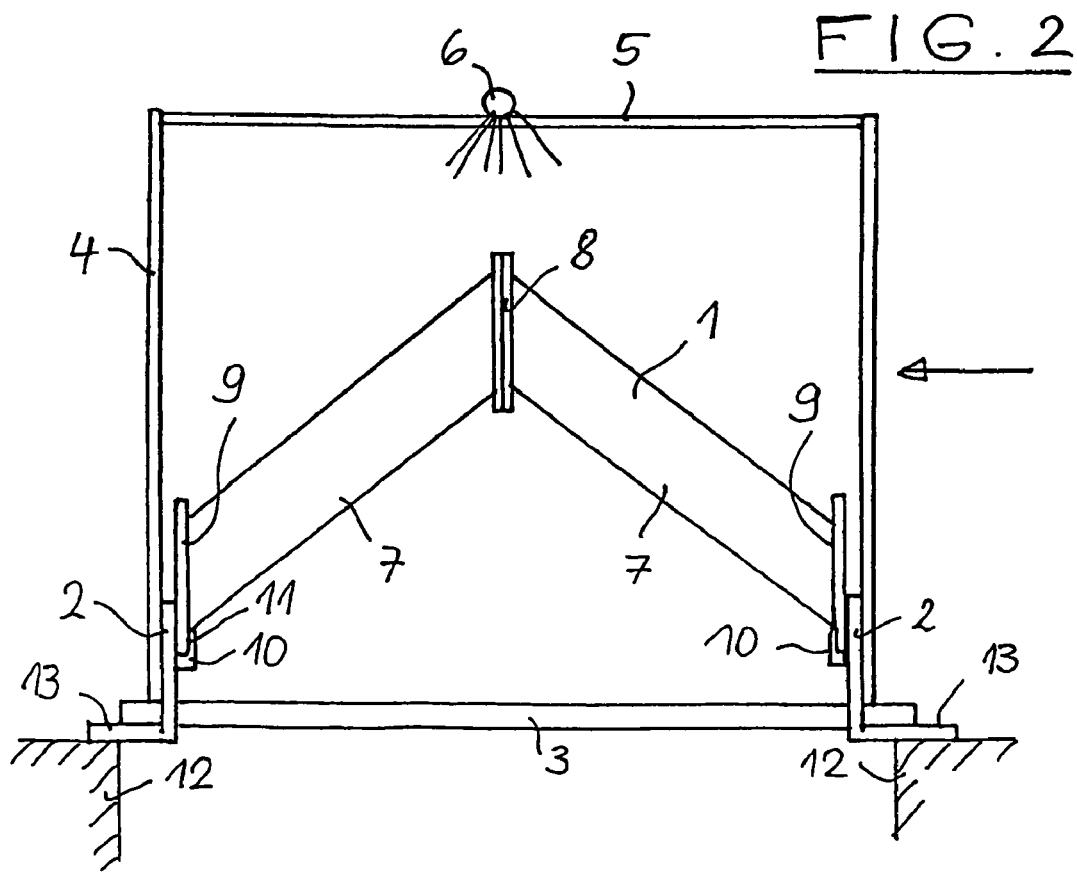
FIG. 2 is a schematic side view of a second embodiment of the invention.

FIG. 2 shows a side view of a differently formed droplet separator installation. Also in this case a roof-like droplet separator profile row 1 is supported on the metal beams of a support structure, which is for instance arranged in a gas washer, by means of an intermediate structure. Also in this embodiment the intermediate structure has two side walls 2, two vertical rods 4 fixed thereto, a lower cross rod 3 and an upper cross rod 5 on which a nozzle tube 6 as rinsing means is supported. All the components of the intermediate structure are fixedly connected to one another, for instance by screwing. Also in this embodiment the intermediate structure is supported on the metal beams of the support structure 12 by means of side flanges 13 of the side walls 2.

However, here the individual droplet separator profiles 7 of the droplet separator profile row 1 are not connected to the side wall 2 of the intermediate structure in a fixed manner but have a common lower end wall 9 by means of which they are combined to obtain a droplet separator profile package. Accordingly, the individual profiles are fixedly connected to the lower end wall 9, for instance by screwing. This side wall 9 is detachably supported at the end wall 2 of the intermediate structure and is displaceably supported in longitudinal direction thereof and substantially undisplaceably supported in transverse direction thereof. For this, the side wall 2 has a lug 10 projecting inwardly and then extending upwardly in FIG. 2 to form a groove 11 for the reception of a part of the end wall 9. This end wall 9 is displaceably supported in a direction perpendicular with respect to the sheet plane of FIG. 2. However, in transverse direction the side wall 2 forms an abutment so that the droplet separator profile package can be supported at the same in order to intercept a pressure acting from above.

Accordingly, with this embodiment the droplet separator profile row 1 is detachably supported at the intermediate structure so that for servicing the droplet separators only the droplet separator package has to be dismounted or exchanged while the intermediate structure can remain at its place.

Figure 3:
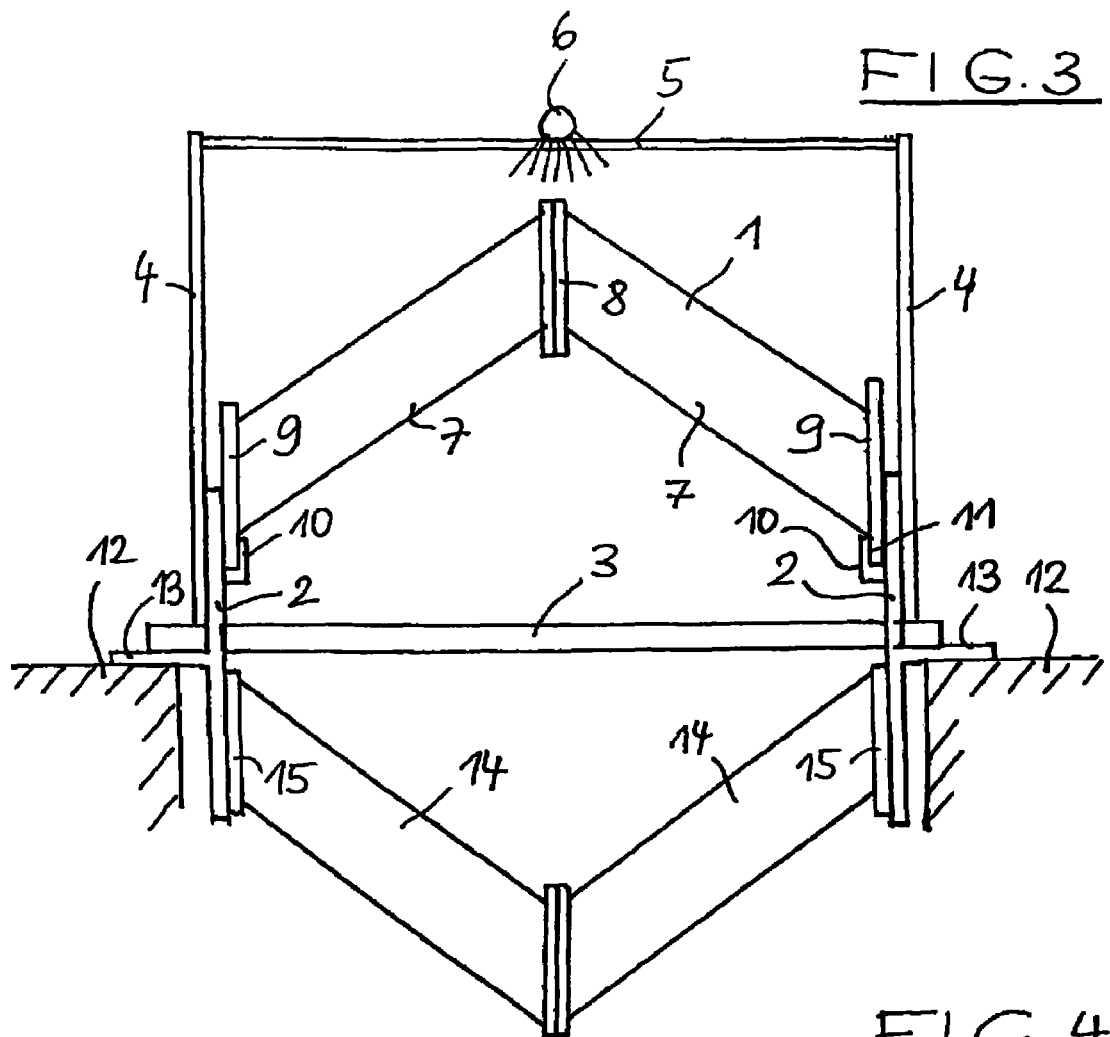
FIG. 3 is a side view of a further embodiment of an inventive droplet separator installation with two superposed droplet separator profile rows which have a common intermediate structure.

FIG. 3 shows another embodiment of an inventive droplet separator installation in a schematic side view according to which two rows 1, 14 of droplet separator profiles are arranged one above the other. The upper row 1 is formed in a roof-like manner while the lower row 14 is formed in a V-like manner. Both droplet separator profile rows 1, 14 share a common intermediate structure which, also with this embodiment, consists of two side walls 2, two vertical rods 4 fixed thereto, a central cross rod 3 and an upper cross rod 5 on which a rinsing means in the form of a nozzle tube 6 is arranged. The intermediate structure lies upon the support structure 12 with side flanges 13 of the side walls 2.

According to this embodiment the upper droplet separator profile row 1 is detachably mounted at the two side walls 2 while the lower droplet separator profile row 14 is connected to the side walls 2 in a fixed manner. According to this embodiment the two side walls 2 have an inwardly and then upwardly extending lug 10 either which forms a groove 11 in which an end wall 9 of the droplet separator profiles 7 combined in a package is detachably and longitudinally displaceably supported. Accordingly, with this embodiment the droplet separator profile row 1 can be dismounted from the intermediate structure and can be exchanged without any problems either. Of course, also the lower droplet separator profile row 14 can be detachably arranged at the intermediate structure. The fixed installation shown here is only example.

Figure 4:
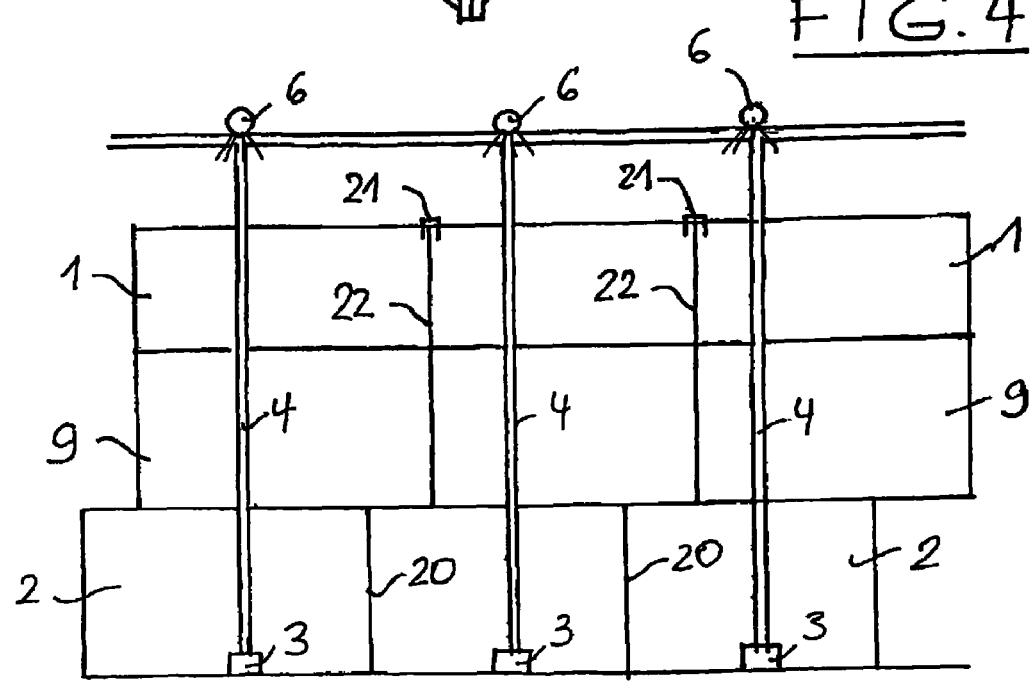
FIG. 4 is a view of the droplet separator installation of FIG. 2 in the direction of the arrow shown in FIG. 2.

FIG. 4 shows a schematic view of the droplet separator installation of FIG. 2 in the direction of the arrow shown in FIG. 2. One recognizes the intermediate structures arranged one besides the other of which the side walls 2 with the vertical rods fixed thereto and the cross rods 3 fixed thereto are shown. According to this embodiment the rows 1 of the adjacent droplet separator profiles which are arranged in a roof-like manner and combined in a package are arranged offset with respect to the side walls 2. One recognizes that the respective lower end walls 9 of the droplet separator profile packages extend beyond joints 20 between the side walls 2 so that no gap extending from above to below is formed. In order to form a rectilinear termination between the droplet separator profile rows 1 and the side walls half droplet separator profile packages are used at the ends.

Figure 5:
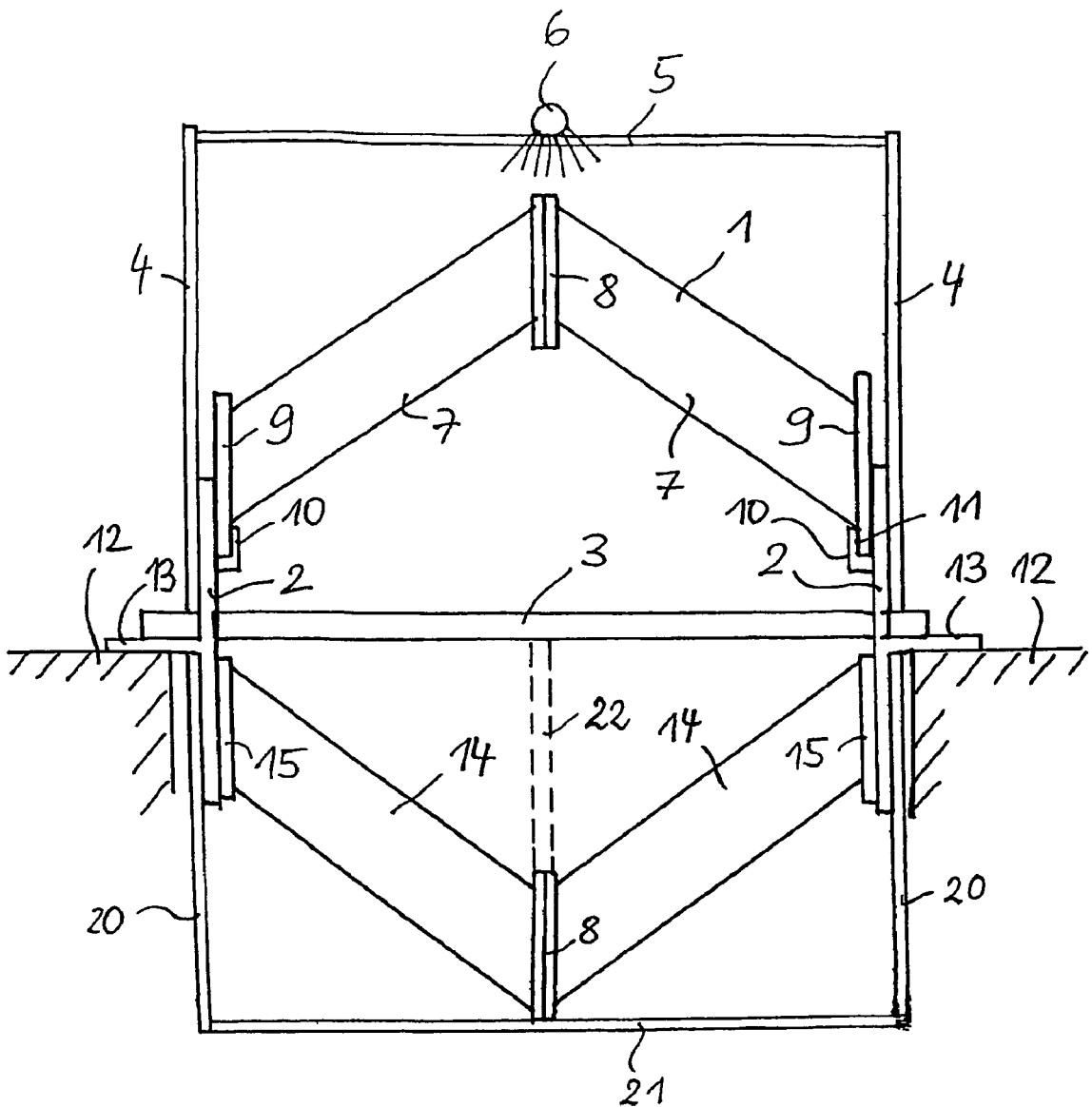
FIG. 5 is a side view of still another embodiment of an inventive droplet separator installation with two superposed droplet separator profile rows having a common intermediate structure.

FIG. 5 shows a lateral view of still another embodiment of an inventive droplet separator installation with two superimposed droplet separator profile rows which share a common intermediate structure. This embodiment substantially corresponds to the embodiment shown in FIG. 3 so that in the following only the differences with regard to the embodiment of FIG. 3 are discussed.

According to the embodiment shown in FIG. 5 the lower droplet separator profile row 14, which is arranged like a V, is fixedly connected to the lower portion of the side walls 2 of the common intermediate structure by means of two end walls 15. Furthermore, the lower droplet separator profile row 14 is centrally supported at a cross rod 21 by means of its two central end walls 8 while it is carried by lateral and downwardly extending vertical rods 20 which are fixed to the two side walls 2 of the intermediate structure. Accordingly, by the support at the cross rod 21 the lower droplet separator profile row 14 is even safer supported than with the embodiment of FIG. 3.

In addition to or instead of the support by the lower cross rod 21 the lower droplet separator profile row 14 can be suspended at the upper cross rod 3 either, as indicated with dashed lines at 22.

In FIG. 5 an embodiment is shown according to which the lower droplet separator profile row 1 is fixedly connected (welded) to the side walls 2 of the intermediate structure by means of end walls 15. However, instead of this fixed connection also the lower droplet separator profile row 14 can be detachably supported at the side walls 2 as the upper row 1 wherein in this case corresponding lugs 10 can be provided at the side walls 2. The support of the lower droplet separator profile row 14 at the lower cross rod 21 is preferably realized by screwing. Of course, the lower cross rod 21 can serve for the arrangement of rinsing means either which can spray onto the lower droplet separator profile row 14 laterally from below.

The invention claimed is:

1. A droplet separator comprising:
   a plurality of rows of parallel droplet separator profiles through which droplet-carrying gas passes in a flow direction;
   a respective end wall on each of the rows joining the respective row together into a respective profile package;
   rinsing means spaced in the direction from the rows of profiles for spraying a liquid on the profiles; and
   an intermediate structure including
      at least one side wall,
      at least one lug fixed on and projecting inwardly and upwardly from the side wall and forming an upwardly open and longitudinally extending groove, the end walls of the packages being fitted to the groove so as to support the packages on the side wall, the end walls being longitudinally slidable in the groove, and
      a carrier for the rinsing means fixed to the side wall.

2. The droplet separator defined in claim 1 wherein the end walls fit into the groove and are horizontally transversely nonmovable therein.

3. The droplet separator according to claim 1, further comprising:
   fixation means which can be simply dismounted connecting together the packages one next to the other.

4. The droplet separator according to claim 3, wherein the droplet separator profile packages arranged one beside the other are clamped with one another.

5. The droplet separator according to claim 1, wherein there are a plurality of such intermediate structures arranged one beside the other.

6. The droplet separator according to claim 5, wherein the side walls of the intermediate structures arranged one beside the other have joints spaced from joints of the end walls of the droplet separator profile packages arranged one beside the other.

7. The droplet separator according to claim 1, wherein the intermediate structure has at least one cross beam connected to the side wall.

8. The droplet separator according to claim 1, wherein the end plates of the oppositely inclined droplet separator profiles of a package are removably fixed to one another by lateral locking.

9. The droplet separator according to claim 1, wherein there are two superimposed rows of droplet separator profiles of which the upper row is formed in a roof-like manner and the lower row is formed in a V-like manner.

10. The droplet separator according to claim 1, wherein there are two superimposed rows of droplet separator profiles of which the upper row is formed in a V-like manner and the lower row is formed in a roof-like manner.

11. The droplet separator according to claim 1, wherein a droplet separator profile row arranged in a V-like manner is centrally supported at a cross rod of the intermediate structure.

12. The droplet separator according to claim 1, wherein a droplet separator profile row arranged in a V-like manner is centrally suspended at an upper cross member of the intermediate structure.

13. A droplet separator comprising:
   a plurality of rows of parallel droplet separator profiles through which droplet-carrying gas passes in a flow direction;
   a respective end wall on each of the rows joining the respective row together into a respective profile package;
   rinsing means spaced in the direction from the rows of profiles for spraying a liquid on the profiles;
   to an intermediate structure including
      at least one side wall,
      at least one lug fixed on and projecting inwardly and upwardly from the side wall and forming an upwardly open groove, the end walls of the packages being fitted to the groove so as to support the packages on the side wall, the end walls being longitudinally slidable in the groove, and
      a carrier for the rinsing means fixed to the side wall; and
   a second such plurality of rows of parallel droplet separator profiles spaced in the direction from the first-mentioned plurality, and mounted on the side wall.

14. The droplet separator defined in claim 13 wherein the second such plurality of rows of profiles is permanently fixed to the side wall.

* * * * *